United States Patent
Demoro et al.

(10) Patent No.: US 6,718,234 B1
(45) Date of Patent: Apr. 6, 2004

(54) SYSTEM FOR ON LINE INFERENCE OF PHYSICAL AND CHEMICAL PROPERTIES AND SYSTEM FOR ON LINE

(75) Inventors: Esdras Piraguacy Demoro, Porto Alegre (BR); Autur Toledo Martins De Oliveira, Porto Alegre (BR); Celso Axelrud, Porto Alegre (BR)

(73) Assignee: Braskem S.A., Camacari (BR)

( * ) Notice: Subject to any disclaimer, the term of this patent is extended or adjusted under 35 U.S.C. 154(b) by 0 days.

(21) Appl. No.: 09/806,933

(22) PCT Filed: Oct. 7, 1999

(86) PCT No.: PCT/BR99/00081

§ 371 (c)(1),
(2), (4) Date: Dec. 4, 2001

(87) PCT Pub. No.: WO00/22489

PCT Pub. Date: Apr. 20, 2000

(Under 37 CFR 1.47)

(30) Foreign Application Priority Data

Oct. 8, 1998 (BR) ............................................. 9803848

(51) Int. Cl.[7] .......................... G05B 21/00; G05B 13/02

(52) U.S. Cl. .......................... 700/269; 700/30; 700/31; 700/32; 700/33; 700/34

(58) Field of Search .............................. 700/269, 29–34

(56) References Cited

U.S. PATENT DOCUMENTS

| | | |
|---|---|---|
| 4,235,983 A | 11/1990 | Steigelmann et al. |
| 5,282,261 A | 1/1994 | Skeirik |
| 5,479,573 A | 12/1995 | Keeler et al. |
| 5,675,253 A | 10/1997 | Smith et al. |
| 5,684,711 A | 11/1997 | Agrafiotis et al. |

FOREIGN PATENT DOCUMENTS

| | | |
|---|---|---|
| EP | A1853975 | 7/1998 |
| WO | A1-9641822 | 12/1996 |

OTHER PUBLICATIONS

Simkina et al. "Study of methods to reduce the dimensionality of multidimensional mathematical models as exemplified by the polymerization of propylene in a looping reactor", Tr. Mosk. In–t Neftekhim. i Gaz. Prom–sti (1979), 147, 109–14.*

Lepskii et al. "Mathematical modeling of polymerization of propylene in a loop reactor", Sb. Tr. Vses. Ob'edin. Neftekhim. (1976), (13), 34–45 From: Ref. Zh., Khim. 1977, Abstr. No. 22S302, Title.*

Shao et al. "Novel approaches to confidence bound generation for neural network representations", IEE Conference Publicatio (1997),440(Artifical Neural Networks), 76–81.*

Uvarov et al. "Development of a mathematical model for controlling the yield of . . . "Polim. Protsessy, Appar.–Tekhnol. Oformlenie Mat. Model. (1974), 165–8. Editor(s): Konsetov, V. V. Okhtinskoe Nauchno–Proizvod. Ob'edin. "Plastpolimer": Leningrad, USSR.*

Agamennoni et al. "Inferential measurement through a neural network model: application to an industrial unit".*

* cited by examiner

*Primary Examiner*—Arlen Soderquist
*Assistant Examiner*—Yelena Gakh
(74) *Attorney, Agent, or Firm*—Birch, Stewart, Kolasch & Birch, LLP

(57) ABSTRACT

A system for on line inference and control of physical and chemical properties of polypropylene and its copolymers is described. The system comprises models for the inference of physical and chemical properties that are not continuously measured and relevant models to control these properties as well as production rate, density of the reaction medium and other process variables of interest. The described control system allows to maximize production rate as well as catalyst yield in the producing process.

12 Claims, 4 Drawing Sheets

|  | controlled variables and constraints |  |  |  |  |  |  |  |  |  |  |  |  |  |  |  |  |  |  |  |
|---|---|---|---|---|---|---|---|---|---|---|---|---|---|---|---|---|---|---|---|---|---|
|  | SPLIT | LPR | 1PR | 1DEN | 1IF | 1%C2 | 2DEN | 2IF | 2%C2 | %C2PP | %C2BIPO | IV | IF_RFG | 1TV | 1JI | 2TV | 2JI | 1DT | 2DT | PRESS | TV_RFG |
| CAT | X | X | X |  | X |  |  | X |  | X |  |  | X | X |  | X |  |  |  | X | X |
| 1C3= | X | X | X | X | X |  |  | X |  |  |  |  |  | X | X | X |  | X | X |  |  |
| 1[H2] | X | X | X | X | X |  |  | X |  | X |  |  | X | X |  | X |  | X | X |  |  |
| 1C2= | X | X | X |  | X | X |  | X | X |  |  |  | X |  | X |  |  | X | X |  |  |
| 2C3= | X | X |  |  |  |  | X | X |  |  |  |  |  | X | X |  | X |  |  |  |  |
| 2[H2] | X | X |  |  |  |  | X |  | X |  | X |  |  | X |  |  | X |  |  |  |  |
| 2C2= | X | X |  |  |  |  | X | X |  |  |  |  |  | X |  |  | X |  |  |  |  |
| T/D | X | X | X |  | X |  |  | X |  |  |  |  |  | X |  | X |  |  |  |  |  |
| H/ET |  |  |  |  |  |  |  |  |  |  |  | X |  |  |  |  |  |  |  |  |  |
| ET/(ET+PR) |  |  |  |  |  |  |  |  |  | X |  |  |  |  |  |  |  |  |  |  |  |
| C2=_RFG |  |  |  |  |  |  |  |  |  | X |  | X |  |  |  |  |  |  |  | X | X |
| 1TIC | X | X | X |  | X |  |  | X | X |  |  |  | X | X |  | X |  | X |  |  |  |
| 2TIC | X | X |  |  |  |  |  | X |  |  |  |  |  |  | X |  | X |  |  |  |  |
| 1DEN |  |  |  |  | X |  |  |  |  |  |  |  |  |  |  | X |  |  |  | X | X |
| 2DEN |  |  |  |  |  |  |  |  |  |  |  |  |  |  |  |  |  |  |  | X | X |
| LEVEL |  |  |  |  |  |  |  |  |  |  |  |  |  |  |  |  |  |  |  | X | X |
| T402 |  |  |  |  |  |  |  |  |  |  |  |  |  |  |  |  |  |  |  | X |  |
| 1PR |  |  |  | X |  | X |  |  | X |  |  |  |  |  | X |  |  | X | X |  |  |
| 2PR |  |  |  |  |  |  | X |  | X |  |  |  |  |  |  | X |  |  | X | X |  |

SYSTEM FOR ON LINE INFERENCE OF PHYSICAL AND CHEMICAL PROPERTIES AND SYSTEM FOR ON LINE

This application is the national phase under 35 U.S.C. §371 of PCT International Application No. PCT/BR99/00081 which has an International filing date of Oct. 7, 1999, which designated the United States of America.

FIELD OF THE INVENTION

The present invention relates to a system for on line inference and control, of the physical and chemical properties of polypropylene and its copolymers with other olefins produced in loop reactors, and, optionally, other gas-phase reactors, either isolated or combined in series, with the aid of mathematical models. More specifically, said system consists of models to infer physical and chemical properties that are not continuously measured and of relevant models to control these properties as well as other process variables of interest in the process being studied. The control system further enables the maximization of production rate and catalyst yield of producing process.

BACKGROUND INFORMATION

Usually, control of process variables in petrochemical plants is manually carried out by periodically taking product samples to be tested, while maintenance and correction actions concerning operating conditions are taken in order to obtain a product having desired characteristics. This procedure involves delays related to required corrections, since sampling and analysis are usually delayed as compared to the on line process, not to mention any human mistakes.

On the other hand, rigorous and empirical modeling techniques may be used to build process models. These mathematical models are able to infer the value of certain process variables which are measured periodically based on the values of other process variables which are measured continuously. Besides, the mathematical models can also be used to predict the future behavior of process variables resulting from modifications of the plant operating conditions.

Rigorous modeling techniques are based in the natural laws which dictate the fundamental relationships among process variables. Rigorous models are difficult to obtain and demand a high level of knowledge about the process. Besides, the complexity of the equations that constitute the rigorous model make it inadequate for on line implementation due to the long time necessary for its execution, even using computers.

In compensation, the techniques of empirical modeling do not require such a deep knowledge about the process and result in simpler mathematical models, that can be executed quickly being more adequate for real time execution. The disadvantage of empirical models is the fact they cannot be used in operating conditions different from those used in its identification. Linear and nonlinear regression models and neural nets are examples of empirical modeling techniques commonly cited in the open literature.

In the systems for inference and control described in present invention, the preferred modeling technique comprises the use of neural networks.

Neural networks are networks of elements interconnecting themselves in a unique way. Typically, networks consist of input neurons that receive signals or information from the outside of the network, output neurons that transmit signals or information to the outside of the network, and, at least, one intermediate layer of neurons that receive and pass information on to other neurons.

A system for controlling polymeric intrinsic viscosity during its production was described in the U.S. Pat. No. 3,878,379. However this technology was specific for the production of polyethylene terephtalate polyester and it comprised just a single output, excluding the control of others polymer properties.

The open literature contains a series of publications that deal with inference and control of processes in a general way using neural networks. U.S. Pat. No. 5,111,531 teaches how to implement an on line predictive control system applied to a continuous process where a neural network predicts the value of a controlled variable, the values of manipulated variables being adjusted so that the value predicted by the network closely approaches the desired value.

U.S. Pat. No. 5,175,678 teaches how to implement an on line feedforward control system using neural networks.

U.S. Pat. No. 5,282,261 teaches how to implement an inference and control system in a continuous process using neural networks.

U.S. Pat. No. 5,479,573 teaches how to develop a predictive network to operate in real time, or in training mode. Preprocessed data is used as inputs of the model for the system, which provides a predicted output that is used in the distributed control system.

U.S. Pat. No. 5,675,253 teaches how to use a neural network to develop a model, which correlates process variables together with the results of an on line nuclear magnetic resonance system to predict a desired property of the polymer.

U.S. Pat. No. 5,729,661 teaches a method and a device to preprocess input data for a neural network. Data is preprocessed to replace wrong data, or to fill in missing data and then used to train a model.

Examples of inference systems that use neural networks applied to specific processes are also found. U.S. Pat. No. 5,548,528 teaches how to build a system to continuously monitor pollutant emissions. Such system uses the neural networks to replace instruments that perform pollutant analysis in a plant. Then, the value predicted by the neural network is used as a controlled variable in a control system.

WO Patent 98/26336 teaches a method to infer the blade temperature of a vapor turbine. This invention uses temperature and pressure from other places of the turbine as inputs of a neural network that predicts blade temperature.

However, no published Patents, neither isolated nor in combination with other published literature, explains the on line inference of physical and chemical properties of polypropylene and its copolymers with other olefins produced in loop reactors and, optionally, in other gas-phase reactors, either isolated, or combined in series from measured process variables using mathematical models. Further, no Patent teaches or suggests the on line control of process variables such as production rate, density of reaction medium, and physical and chemical properties of polypropylene and its copolymers with other olefins produced in loop reactors, and, optionally, in other gas-phase reactors, either isolated or combined in series using mathematical models, such on line control and inference being enabled by the system described and claimed in present invention.

SUMMARY OF THE INVENTION

The present invention, as disclosed and claimed herein, is directed to a system for on line inference of physical and chemical properties of polypropylene and its copolymers produced in a plant using loop reactors, and, optionally, gas-phase reactor(s) with the aid of mathematical models, such system comprising the steps of:

collecting data of all variables measured in the plant, so as to build a large historical database;

out of said large database, selecting a subset including historical data on the physical and chemical properties to be inferred, as well as potential input variables for mathematical models so as to build a small database;

treating data of said small database, removing non-representative data of usual operating conditions, applying noise removal filters on signals and complementing said database with new calculated variables based on theoretical concepts such as energy and mass balances;

from the data of said small database, selecting those variables that will be the input variables of the mathematical model;

using said input variables to identify these models off line;

applying the so identified mathematical models to the real-time measurements of the input variables to the model used to calculate the on line inference of desired physical and chemical properties.

The present invention also provides an on line control system for a plant of polypropylene, and its copolymers produced in loop reactors, and, optionally, gas-phase reactor(s) using mathematical models, the system being based on a control matrix which comprises controlled variables, constrained controlled variables, manipulated variables, and disturbance variables.

Thus, the present invention provides a system for the on line inference and control of physical and chemical properties of polypropylene and its copolymers.

The present invention also provides a system for the on line control of the production rate of polypropylene and its copolymers, of the density of the reaction medium as well as other process variables.

Further, the present invention provides an on line control system for a plant of polypropylene and its copolymers with the aid of mathematical models based on a control matrix that enables the maximization of the production rate, as well as of the catalyst yield.

DETAILED DESCRIPTION OF THE PREFERRED EMBODIMENTS

In the present specification, the expression on line means that the physical and chemical properties, which are desired to infer, are obtained in real time.

The expression polymer quality refers to the physical and chemical properties of the polymer such as melt flow index, viscosity, chemical composition, etc. that affect end-use properties of the resin.

The expression SISO (Single Input Single Output) control strategy means that a single manipulated variable is adjusted to control a given controlled variable.

The expression MIMO (Multiple Input Multiple Output) control strategy means that multiple manipulated variables are adjusted at the same time so as to control a set of controlled variables.

The expression gas-phase reactor means that, at least, one gas phase and one solid phase are present in the reactor. The preferred gas-phase reactor is a fluidized-bed reactor, but other reactors can be used.

The expression loop reactor refers to a tubular reactor with a high recycle rate, where the produced polymer is entrained by the flow of a liquid phase.

Figure 3:
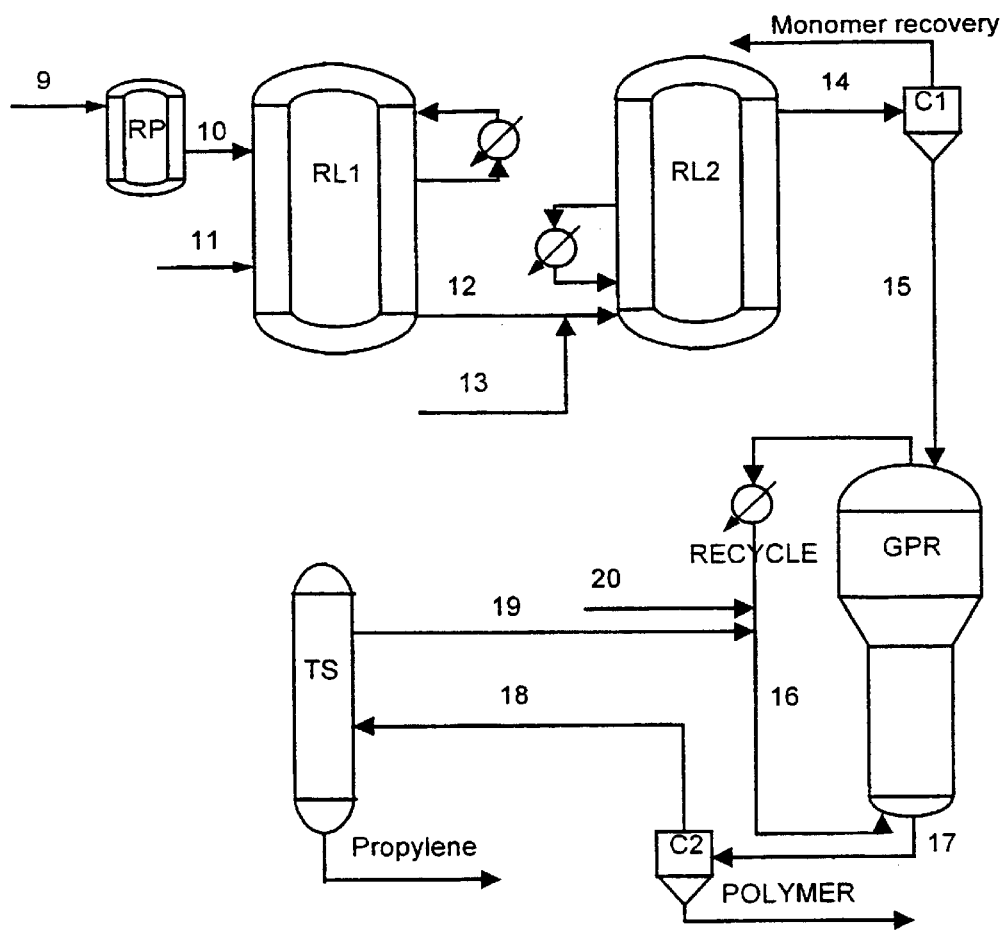
FIG. 3 represents a simplified plant for the production of polypropylene, to which the present invention is applied.

Broadly, the present process applies to reactor arrangements as presented in FIG. 3. However, other arrangements are also possible as follows:

one or more loop rectors connected in series; and one or more loop reactors connected in series, followed by one or more gas-phase reactor(s) connected in series.

The present process is specially directed to the polypropylene homopolymer, copolymer, or terpolymer. The comonomers, in the case of copolymers or terpolymers, may be selected, besides propylene, among the group of reactive olefins, such as: ethylene; 1-butene; 2-methyl propylene; 1-pentene; 1-hexene; 1-heptene; 1-octene; 1-decene; 3-methyl 1-butene; 4-methyl 1-pentene; cyclopentene, the comonomers being polymerized alone or in admixture.

The preferred catalyst is a Ziegler-Natta type catalyst, but others may be used as well.

Figures 1, 2:
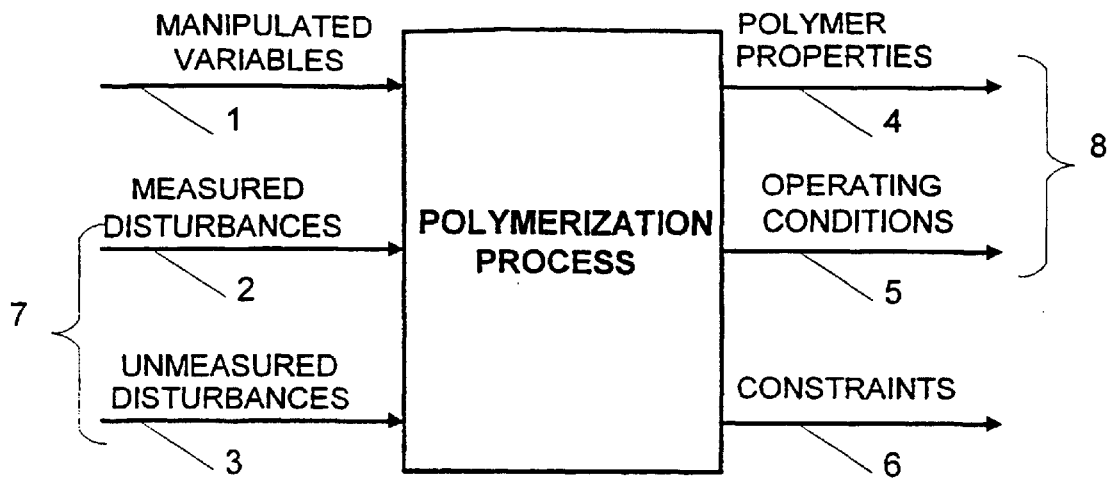
FIG. 1 represents the categories of process variables pertaining to a chemical process.
FIG. 2 represents a control matrix.

In order to establish a control strategy for polymerization reactors, it is convenient that process variables be classified according to FIG. 1 as: controlled variables (8), manipulated variables (1), constrained controlled variables, or simply, constraints (6), and disturbance variables, or simply, disturbances (7).

Controlled Variables (CV's) are those variables the value of which must be maintained as close as possible to a desired value, or set point. In a polymerization plant, controlled variables can be divided into two categories: physical and chemical properties of the polymer (4), and process variables that define operating conditions of the plant (5).

The physical and chemical properties of the polymer (4), such as melt flow index, viscosity, chemical composition, etc., define polymer quality. Process variables, which define operating conditions of the plant (5), or simply, operating conditions, involve such properties as temperature, pressure, flow rate, etc.

Constrained Controlled Variables (CCV's) are variables that despite being controlled do not require to be maintained close to a set point. However, constrained controlled variables must be controlled so as not to exceed certain limits.

Manipulated Variables (MV's) are variables that must be adjusted so that controlled variables are maintained close to a set point or within certain limits. To be used as a manipulated variable in a control strategy, a process variable must affect at least one controlled variable, or a constrained controlled variable in a certain way. Monomer flow rates, catalysts and cooling water are examples of common MVs. Generally, operators who follow up the operation of a chemical process know, at least qualitatively, the way a certain MV affects a given CV.

Disturbance Variables (DV's) are process variables that also affect controlled variables, but operators' actions can not affect them. Examples of disturbance variables are: content of impurities in the monomer stream fed to the reactor, and catalyst quality. Disturbances are usually caused by known sources, but it is not easy to eliminate them as they are generated by factors that are external to the process. Some disturbances can be measured, but others can not. A control system may take into consideration the measured disturbances (2), promoting thus an adjustment of the manipulated variables before the effects of disturbances are evidenced in the product quality. It is important to emphasize that from the point of view of control, if a process input is not used as a MV, then it can be considered as being a DV.

The key for the successful use of the neural network in inference systems for specific applications is the adequate selection of a set of process variables used as inputs of the neural network. In the case of a process control system, the adequate selection of variables that comprise the control matrix may be more important than the selection of the methodology of process modeling.

In case the neural networks are used to represent process models, network inputs and outputs to be used by the control system are defined by the control matrix of the system itself, since the manipulated variables and disturbance variables must be the network inputs, while the controlled variables and constrained variables must be the outputs.

As an input for controllers, the present invention uses such values as predicted by the neural networks.

The classification of a process variable in one of the above-cited categories is by no means trivial. For example, the hydrogen concentration in the reactor feed may be manipulated to fix the melt flow index of the polymer, and, at the same time, may be the controlled variable in a loop for the control of the concentration which uses the hydrogen flow rate as a manipulated variable. In this case, the manipulated variable used to control the melt flow index is the desired value for hydrogen concentration. Such approach is known as cascade control.

The function of those models used in process control is really the storage of cause/effect relationships among CV's, MV's, and, in some cases, DV's in a format of mathematical equations.

The physical and chemical properties of a polymer as well as the economic features involved in the process, such as production rate and catalyst yield depend on the raw materials used in polymer manufacturing besides the operating conditions of the polymerization reaction. Therefore, once the raw materials to be used in the polymerization are determined, it is very important that the process inputs are manipulated so as to control the physical and chemical properties of the polymer, while keeping high production rates and high catalyst yield.

The majority of the physical and chemical properties that define product quality are not measured on line. In many cases, there are no analyzers that can be directly connected to the process, and even when the technology required to measure these variables is available, the cost of sensors may hinder their use. Therefore, analyses are carried out in a laboratory in one-hour intervals. Thus, during the period between analyses, there is no indication of the product quality, causing a delay between possible modifications in such variables and the implementation of any correction actions as required.

A further relevant point regarding process control is the fact that, generally, economic aspects require the process to be operated close to plant capacity limits. Thus, catalyst flow rate could be manipulated to control the production rate of the reactor, however, when polymerization heat exceeds the limit of the thermal exchange capacity of the reactor, the objective of increasing production even more should be restricted in favor of thermal stability. In view of In view of this example, the importance of considering CCV's in a multivariable control strategy is clear, as these variables will determine the limits under which plant optimization is achieved.

In order to overcome the scarcity of measurements related to polymer quality, process modeling techniques can be used to allow continuous inference of properties that are not continuously available.

In the inference and control systems, described in present invention, the preferred modeling technique comprises the use of neural networks as the process models. Optionally, empirical or rigorous modeling techniques or a combination of rigorous and empirical models, including neural networks could be used instead of neural networks to create said process models.

Neural networks, as mentioned herein, are networks which consist of interconnected elements that perform elementary mathematical operations. Each element receives either a single, or multiple inputs so as to yield an output used as input for different elements in a process which mimics nervous transmission by neurons in the human brain.

Among the several structures suggested for the neural networks, perhaps the one which finds more practical applications is the structure that consists of a layer of neurons that receive external signals or inputs, an intermediate layer that processes a combination of external signals, and an output layer that presents the result of calculations. Each interconnection among neurons is weighted; that is, each interconnection is associated to a weight the value of which is an indication of the degree of importance of the information being transmitted.

The training process of the neural network comprises the use of the data stored in a historical database to adjust network weights. At first, weight values are randomly chosen, and then adjustments are made so as to minimize the difference between the neural network output (also called prediction), and the actual value of the process variable being examined.

As described herein before, polymerization processes present a huge number of inputs and outputs. Cause/effect relationships among different variables are too complex to be assimilated, even by a trained and experienced operator. It could be observed that the most important relationships are assimilated and used in the control of systems composed by only one input and one output (SISO).

One example is the control of the melt flow index (MFI) of the polymer. The variable which mostly affects the melt flow index is the hydrogen concentration in the reactor feed, but there are other variables, such as the reactor temperature, the effect of which on the MFI is not so evident. Typically, upon receiving the results of MFI laboratory analyses, the operator adjusts the hydrogen concentration, without however taking into consideration the temperature of the reactor, since the temperature effect is less evident. Despite the fact that the temperature effect is somehow less important, this type of control is not as effective as it would be if every pertinent cause/effect relationship could be taken into consideration.

Therefore, in order to obtain significant benefits, the control system of those processes should be multivariable (MIMO), comprising various controlled variables as well as various manipulated variables.

Besides, the control system must take into consideration the physical limits of the process under study as well as any disturbance which could possibly be measured. A control technique that presents these characteristics is the Model Predictive Control which is based on process models to determine the best set of actions to be taken so that the controlled variables reach desired values.

U.S. Pat. No. 5,282,261 teaches the use of predicted values by a neural network in real time so as to replace a sensor or a laboratory analysis as a controller input, implementing a system for inference and control in a continuous process using neural networks. On the other hand, U.S. Pat. No. 5,282,261 neither teaches how to apply these values to polymerization processes, in special processes for the production of polypropylene and its copolymers, nor teaches which process variables would influence physical and chemical properties of polypropylene and its copolymers.

Once the neural network "has learned" the relationships among variables and historical data, it can be used for both inference and control.

In the case of inference, the role of the neural network is to provide real-time estimates for variables that are not continuously available.

In case the neural network is used for predictive control, the role of the network is to predict the future behavior of the CVs and CCVs if certain adjustments on MVs are done and if DVs vary.

A multivariable control system may be precisely characterized by a set of manipulated variables, controlled variables, constraints, and disturbances considered in the modeling of the system. The set of variables determines what may be encompassed by the control system as well as its capacity to be used for optimizing a process.

A control matrix may represent a multivariable control system as the one presented in FIG. 2. In this matrix, columns represent controlled variables (CV's) and constraints (CCV's), while the lines represent manipulated variables (MV's) and measured disturbances (DV's). Marked positions within the control matrix indicate that a given MV, or DV is used in the modeling of a given CV, or CCV.

FIG. 3 illustrates the main unit operations carried out in a polypropylene plant that is the object of the present invention. Stream 9 represents feed streams of catalyst, cocatalyst, electron donor, propylene, and hydrogen to the pre-polymerization reactor, PR. Stream 10 represents the transfer of pre-polymerized catalyst to the first loop reactor, LR1, to which propylene, hydrogen, and optionally, comonomer(s) are fed, represented by stream 11. Stream 12 represents the stream which exits LR1, to which is added stream 13, said stream 13 representing the feed of propylene, hydrogen, and, optionally, comonomer(s); both streams, 12 and 13, represent the feed of the second loop reactor, LR2. Stream 14 represents the exit of LR2 to the monomer recovery cyclone, C1, which separates the polymer formed in the reactors from excess monomer. Excess monomers are recovered. Stream 15 feeds the gas-phase reactor, GPR. To the GPR is directed stream 16, made up of the recycle stream of the GPR, by stream 19 and by stream 20. Stream 20 may be made up of propylene, comonomer(s), and hydrogen. Stream 17 effects the discharge from the GPR to cyclone C2, from where stream 18 and a polymer stream are separated. The polymer stream is sent to degassing, deactivation, and extrusion. Stream 18 is fed to the separation tower, ST. Two streams leave the ST, a propylene stream, and stream 19 which is fed to the GPR. FIG. 3 illustrates one process configuration, however, the present invention is not restricted to this configuration only, as it applies to other arrangements of loop reactor(s), and, optionally, to gas-phase reactor(s).

Among the main objectives of a plant which produces polypropylene and its copolymers is the manufacturing of polymers with physical and chemical properties within certain specifications, and the optimization of economic objectives such as specific consumption of catalyst, and plant production rate, that is, the purpose is to minimize catalyst consumption per ton of polymer produced, and to maximize the ton/h ratio of the polymer produced.

Traditionally, in such a plant, reactors are operated according to pre-established procedures, and laboratory analyses indicate if it is necessary to make adjustments in operating conditions so that product quality is maintained within specifications. Laboratory analyses involve measurements such as: melt flow index, percentage(s) of comonomer(s) incorporated in the copolymer, percentage of xylene-soluble matter, intrinsic viscosity, and percentage(s) of comonomer(s) incorporated in the fraction of polymer produced in the gas-phase reactor.

Loop reactors contain a reaction medium made up of liquid propylene, and solid polymer. The density of this reaction medium is measured on line by a density gage, and it is controlled by a SISO PID control algorithm. The density of the reaction medium is inversely proportional to the catalyst consumption per ton of polymer produced. The reaction medium is made to circulate within the loop reactors with the aid of pumps. The solid phase contains a small fraction of catalyst that remains intimately connected to the polymer. Small amounts of hydrogen are added to the liquid phase of the reaction medium so as to modify the molecular weight of the polymer. The use of different concentrations of hydrogen in each loop reactor results in a bimodal polymer. The production rate and the polymer quality are controlled in an open loop by means of SISO systems.

The control of the physical and chemical properties of the polymer when the gas-phase reactor is operating is based on the open-loop adjustment of the concentrations of comonomer(s), propylene, and hydrogen within the reactor, or on the open-loop adjustment of operating conditions of the loop reactors. The gas composition within the gas-phase reactor is measured at intervals of a few minutes by gas chromatography, said composition being controlled by SISO PID control algorithms. A heat exchanger removes reaction heat from the recycle stream. As in the case of loop reactors, the heat which is exchanged depends on the flow rate of the cooling water which flow s through the heat exchanger.

Therefore, the state-of-the-art control strategy in a plant that produces homopolymer polypropylene and its copolymers with varied olefins is based on an open-loop SISO control of the production rate of reactors, as well as of the variables that define/affect the quality of the polymer. In other words, to each controlled variable corresponds a manipulated variable that is adjusted according to the judgment and experience of an individual. Thus, this configuration is not very effective, as it does not take into consideration the interaction among the several objectives of control. The changes in hydrogen flow rate, with the purpose of controlling the melt flow index of the polymer, cause changes in the production rate and in the density of the reaction medium. A further example of interaction is how the reaction medium density is affected when changes in catalyst flow rate are done in order to control the production rate. Besides the interaction problem, analyses involved in the measurement of the polymer properties result in delays which render more difficult any required corrective actions.

In view of the considerations above, according to the present invention, and aiming to an effective operation of the plant at issue, it is required:

an on line system that infers the properties that are not continuously available;
   a control system that can evaluate the interaction among different control objectives as well as the different process variables.

Thus, it is possible to minimize problems related to the low frequency of laboratory analyses carried out on the variables that affect polymer quality, and to the interaction among control loops.

TABLE 1 below lists the physical and chemical properties of the polymer that are inferred in each reactor.

TABLE 1

| 1st loop reactor | 2nd loop reactor | Gas-phase reactor |
|---|---|---|
| Melt Flow index Percentage(s) of comonomer(s) incorporated in copolymer | Melt flow index Percentage(s) of comonomer(s) incorporated in copolymer Percentage of xylene-soluble matter | Melt Flow index Intrinsic viscosity Percentage(s) of comonomer(s) incorporated in copolymer Percentage(s) of comonomer(s) incorporated in the fraction of copolymer produced in gas-phase reactor Percentage of xylene-soluble matter |

TABLE 2 lists the physical and chemical properties of the polymer which are controlled in each reactor. This table indicates whenever a given variable is a controlled variable (CV), or a constraint (CCV).

Besides those models, two further models were also built. One of such models was built to predict the production rate of the arrangement of loop reactors, while the other one was built to predict the ratio between the production rates of two consecutive loop reactors (split).

TABLE 2

| | 1st loop reactor | 2nd loop reactor | Gas-phase reactor |
|---|---|---|---|
| CV | Melt flow index Percentage of comonomer(s) incorporated in copolymer Density of reaction medium Production rate | Melt flow index Percentage of comonomer(s) incorporated in copolymer Density of reaction medium | Melt flow index Intrinsic viscosity Percentage of comonomer(s) incorporated in copolymer Percentage of comonomer(s) incorporated in the fraction of copolymer produced in gas-phase reactor |
| CCV | Pump power Opening of temperature control valve Difference between the temperature and the bubble point of the liquid within the reactor | Pump power Opening of temperature control valve Difference between the temperature and the bubble point of the liquid within the reactor | Reactor pressure Opening of temperature control valve |

The input variables of each model composing the systems of the present invention are presented below:

Melt Flow Index (MFI)

This property is a controlled variable that is usually correlated to the molecular weight and polymer composition. In the state-of-the-art technique, the melt flow index is evaluated through periodical sampling, which causes time gaps between successive measurements, so as to mask what actually occurs in the plant.

In case the MFI model is designed to infer or to control said property in loop reactors, the relevant parameters are:
   the hydrogen concentration in the feed stream(s) of the reactor(s);
   the flow rate of catalyst fed to the reactor(s);
   the flow rate of propylene fed to the reactor(s);
   the flow rate of comonomer(s) fed to the reactor(s);
   the ratio of cocatalyst flow rate to electron donor flow rate;
   the reactor(s) temperature;

In case the MFI model is designed to infer said variable in gas-phase reactors, the relevant parameters are:
   the hydrogen concentration in the feed stream(s) of the loop reactor(s) preceding said gas phase reactor;
   flow of comonomer(s) fed to said gas-phase reactor;
   the production rate of said gas phase reactor;
   the production rates of the reactor(s) preceding said gas phase reactor;

In case the MFI model is designed to control this variable in gas-phase reactors, the relevant parameters are:
   the hydrogen concentration in the feed stream(s) of the loop reactor(s) preceding the gas phase reactor;
   flow of comonomer(s) fed to gas-phase reactor;
   the flow rate of catalyst fed to the reactor(s);
   the reactor(s) temperature;

Intrinsic Viscosity (IV)

This property is only measured during operation of the gas-phase reactor(s).

In case the IV model is designed to infer or to control said variable in gas-phase reactors, the relevant parameter is:
   the ratio of hydrogen concentration to comonomer(s) concentration within the gas-phase reactor.

Percentage of Xylene-soluble Matter

In case the model of the percentage of xylene-soluble matter is designed to infer said property in loop reactors, the relevant parameters are:
   the flow rate of comonomer(s) fed to the reactor(s);
   the ratio of cocatalyst flow rate to the electron donor flow rate;
   the reactor(s) temperature;
   the density of the reaction medium within the reactor(s).

In case the model of the percentage of xylene-soluble matter is designed to infer said variable in a gas-phase reactor, the relevant parameters are:
   the percentage of xylene-soluble matter present in the polymer fed to said gas-phase reactor;
   the percentage of comonomer(s) in the xylene-soluble matter present in the polymer;
   the percentage of comonomer(s) present in the polymer.

Percentage(s) of Comonomer(s) Incorporated in the Copolymer

This variable is measured both in loop reactors and gas-phase reactors. In case the model(s) of percentage(s) of comonomer(s) incorporated in copolymer is(are) designed to infer and to control said variable in loop reactors, the relevant parameters are:
   flow of comonomer(s) fed to the reactor;
   production rate of the reactor;
   flow of comonomer(s) fed to the preceding reactor(s);
   production rate of the preceding reactor(s);

In case the model(s) of percentage of comonomer(s) incorporated in the copolymer is(are) designed to infer said variable in gas-phase reactors, the relevant parameters are:

flow of comonomer(s) fed to gas-phase reactor;

production rate of gas phase reactor;

production rate of the reactor(s) preceding the gas phase reactor;

In case the model(s) of percentage(s) of comonomer(s) incorporated in the copolymer is (are) designed to control this variable in gas-phase reactors, the relevant parameters are:

the hydrogen concentration in the feed stream(s) of the loop reactor(s) preceding the gas phase reactor;

flow of comonomer(s) fed to gas-phase reactor;

the flow rate of catalyst fed to the reactor(s);

the reactor(s) temperature;

Percentage of Comonomer(s) Incorporated in Bipolymer

It should be understood that bipolymer is the fraction of the polymer produced within gas-phase reactors. This property is only controlled during operation of the gas-phase reactor(s). In case the model(s) of the percentage of comonomer(s) incorporated in bipolymer is designed to infer or to control said variable, the parameter relevant to modeling is:

the ratio of the concentration of a given comonomer to the sum of the concentration of comonomer(s) and the concentration of propylene within the gas-phase reactor.

Production Rate and Opening of the Temperature Control Valve of Loop Reactors

These variables are of utmost importance for the process economics. Lower variance resulting from the use of a more advanced control method such as that described and claimed in the present invention makes that average figures for these variables be increased relative to state-of-the-art control systems, provided the upper limits of the reactors heat exchange capacity, which are reflected in the temperature control valve opening, are not violated.

The models for control of production rate and temperature control valve opening use the following variables as inputs to the mathematical models to predict the future behavior of said variables in loop reactors:

the ratio of flow rate of electron donor to flow rate of cocatalyst that comprise catalytic system;

the hydrogen concentration in feed stream(s) of loop reactor(s);

the flow rate of catalyst fed to loop reactor(s);

the flow rate of propylene fed to loop reactor(s);

the flow rate comonomer(s) fed to loop reactor(s);

the temperature of the loop reactor(s);

Density of the Reaction Medium and Power of the Recirculation Pump of Loop Reactors The models for density of reaction medium and recirculation pump power use the following variables as inputs to the mathematical models to predict the future behavior of said variables:

the flow rate of monomer fed to loop reactor;

the production rate of the loop reactor;

the density of reaction medium of the preceding loop reactor;

Difference Between the Temperature and the Bubble Point of the Liquid Within Loop Reactors The model for the difference between the temperature and the bubble point of the liquid within loop reactors uses the following variables as inputs to the mathematical models to predict the future behavior of said variable:

the hydrogen concentration in feed stream(s) of loop reactor(s) and gas-phase reactor(s);

the flow rate of propylene fed to loop reactor(s);

the flow rate of comonomer(s) fed to loop reactor(s);

the temperature of the loop reactor;

the production rate of the loop reactor(s).

Pressure of Gas Phase Reactors

The model for pressure of gas phase reactors uses the following variables as inputs to the mathematical models to predict the future behavior of said variable:

the flow rate of catalyst fed to the reactor(s);

the density of reaction medium of the loop reactor(s);

the flow rate comonomer(s) fed to the gas phase reactor;

the gas-phase reactor bed level;

the flow rate of gas returning from separation tower;

Opening of the Temperature Control Valve of Gas Phase Reactors

The model for the opening of the temperature control valve of gas phase reactors uses the following variables as inputs to the mathematical models to predict the future behavior of said variable:

the flow rate of catalyst fed to the reactor(s);

the density of reaction medium of the loop reactor(s);

the flow rate of comonomer(s) fed to the gas phase reactor;

the gas-phase reactor bed level;

Ratio Between the Production Rates of Two Consecutive Loop Reactors (Split)

The model for the ratio between the production rates of two consecutive loop reactors (split) uses the following variables as inputs to the mathematical models to predict the future behavior of said variable:

the ratio of flow rate of electron donor to flow rate of cocatalyst that comprise catalytic system;

the hydrogen concentration in feed stream(s) of loop reactor(s) and gas-phase reactor(s);

the flow rate of catalyst fed to loop reactor(s);

the flow rate of propylene fed to loop reactor(s);

the flow rate comonomer(s) fed to loop reactor(s);

the temperature of loop reactor(s);

The several steps which make up the system of the present invention will be further discussed below.

Collection of historical data of the plant of polypropylene and its copolymers with other olefins comprises storing the values of all variables measured during the daily operation of the plant, so as to build a large database.

Selection of variables that will constitute the small database comprises the analysis of a great number of variables that are potentially relevant to the modeling of a given variable to be inferred or controlled. Not every variable is useful when building the mathematical models. The criteria to determine the usefulness of a variable is based on correlation analyses, as well as on the evaluation of models obtained from the use of said variable. Thus, the determination of the adequacy is a cyclic process, obtained conclusions being a feedback to the collection of historical data. Once the mathematical model is identified, many variables will not be useful to the modeling process, and will be discarded.

Treatment of data of the small database comprises the removal of non-representative data due to failures of measurement instruments, or to abnormal operating conditions, as well as application of filters to remove noises which could be found in signals. The database is complemented with new variables calculated from theoretical concepts and mathematical correlations such as energy and mass balances, thermodynamic correlations, or any empirical correlations. These new variables, in turn, can be used as input for the mathematical models.

Mathematical model identification comprises calculation of the model output based on the variables pertinent to the determination of the desired physical and chemical property using the values contained in the smaller database so as to determine the value of the model parameters which minimize the difference between the model prediction and the property actual values. In the case of neural nets, the identification step consists of the determination of the set of weights to be attributed to its connections, so as to obtain a neural mathematical model able to represent the system of interest.

Checking the adequacy of the mathematical model obtained through the evaluation of a qualitative cause/effect relationship between each input variable and the estimated physical and chemical property.

The purpose of the inference system of the variables of the process according to the present invention is to estimate the above cited polymer physical and chemical properties, and comprises a Distributed Digital Control System (DCS), a process computer connected to the DCS, an information system to store the historical data of the plant, and a system fed by data from laboratory analyses.

Figure 4:
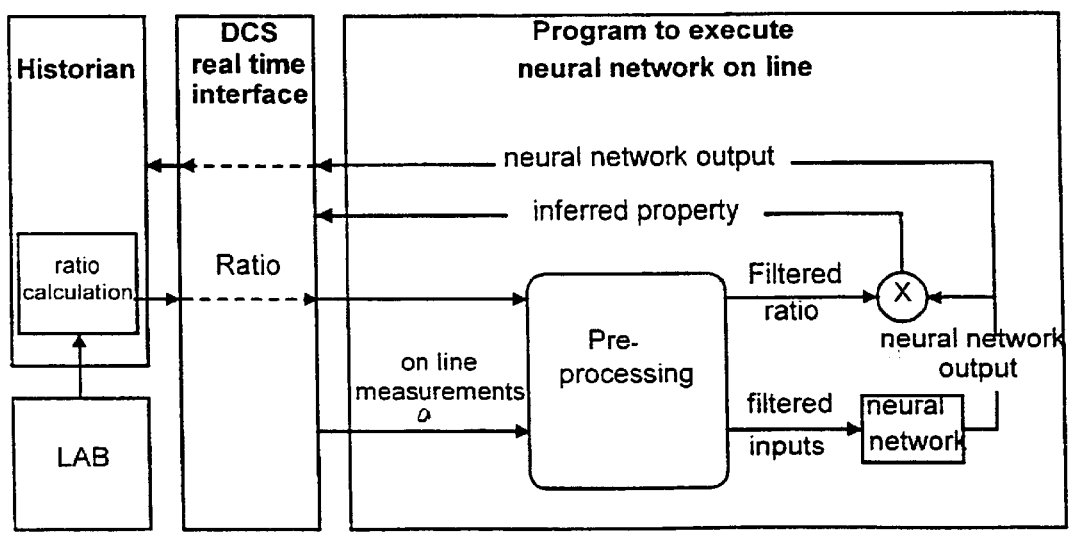
FIG. 4 represents schematically a system for the on line inference according to the invention.

FIG. 4 is a schematic representation of the system for on line inference. When it is desired to infer a property according to the principles of this invention, the inputs of the mathematical models (which in this case are neural networks) are measured in real time by measurement instruments connected to the DCS. The values of said measurements are sent by the DCS to the computer program installed in the process computer responsible for the calculation of the mathematical model. The program that performs the calculations of the model also performs any preprocessing of the input signals if required. The model output is directed to the program that maintains the historical database of the process so that it can be used afterwards.

The inference of the desired property is obtained from the multiplication of the output of the mathematical model by a factor, here called ratio, calculated from laboratory analyses. The purpose of the ratio is to correct possible errors on the estimate done by the model when compared with the results of laboratory analyses. This factor is calculated as the ratio of the value provided by the laboratory to the value estimated by the model at the very moment of the collection of the analyzed sample, and should be filtered before multiplication to avoid sudden changes in the inferred value, such changes being harmful to the control system that receives those signals. The ratio is calculated by the same program responsible for the maintenance of the historical database of the process, since, as mentioned before, this calculation takes into consideration the value estimated by the mathematical model at the moment of the collection of the analyzed sample, a piece of information only present in the historical database.

A modification related to the preferred embodiment consists in the use of another parameter, called bias here, to perform the correction of the output of the mathematical model. The difference is that the bias must be added to the value of the output of the model, and is calculated as the difference between the value provided by the laboratory and the value estimated by the neural mathematical model at the moment of the collection of the analyzed sample. The bias must also be filtered before being added to the output of model.

Figures 5, 6:
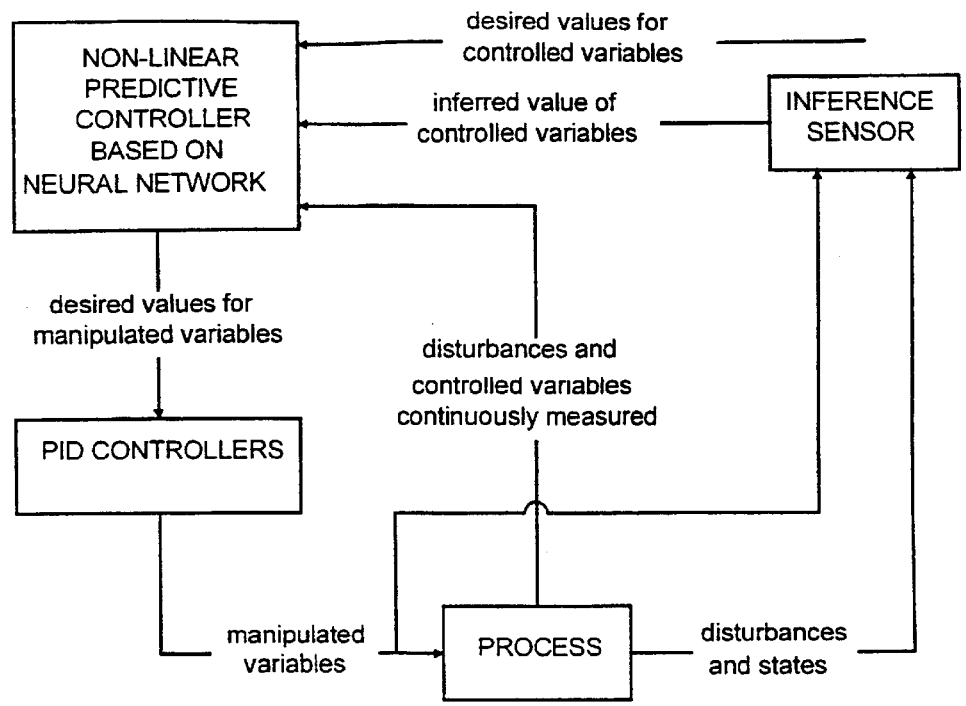
FIG. 5 represents schematically a control system according to the invention.
FIG. 6 represents a control matrix that characterizes a control system according to the invention.

FIG. 5 represents, according to the invention, how the use of an inference system together with a system of predictive control can be implemented. The values estimated for the controlled variables are used as inputs for the predictive controller. Then, the predictive controller solves a problem of non linear optimization to determine the values of the manipulated variables (set points of MV's), so that the controlled variables are maintained close to the desired values, without violating the limits of the plant. PID controllers receive the set points of the Mv's calculated by the predictive controller, and are in charge of maintaining the variables within these values.

The solution for the problems related to control comprises the use of the control matrix represented in FIG. 6. The kind of the process variables shown in FIG. 6 are described in TABLE 3.

The maximization of the production rate and catalyst yield can be carried out through the selection of set points, which are arbitrarily increased, for the controlled variables production rate and density of the reaction medium. This procedure drives the process towards its physical constraints. Thus, the production rate is limited by the capacity of thermal exchange of the system, the control of said parameter being carried out through the opening of the valves for temperature adjustment, while the density of the reaction medium is limited by the power of the circulation pumps of the loop reactors. Thus, a balanced increase in the flow rates of catalyst and monomer is required so that the increase in production rate and density do not cause a violation of such limits as established for the opening of the valves for temperature adjustment, and for the power of the circulation pumps of the loop reactors.

Benefits from the present invention could be noticed from the reduction in standard deviation of controller error calculated as the difference between the value of a process variable and its desired value. Oscillations in production rate and density were reduced thus allowing an increase in the average values of these variables. As a consequence of the increase in these average values, an increase in the production of polymer per kg of catalyst was observed.

TABLE 3

| Variable | Description |
| --- | --- |
| SPLIT | Ratio between the production rates of the 1st and 2nd loop reactors |
| LPR | Production rate of the arrangement of loop reactors |
| 1PR | Production rate of the 1st loop reactor |
| 1DEN | Density of the reaction medium in the 1st loop reactor |
| 1MFI | Melt flow index of the polymer produced in the 1st loop reactor |
| 1% C2 | Percentage of comonomer incorporated in copolymer produced in the 1st loop reactor |
| 2DEN | Density of the reaction medium of the 2nd loop reactor |
| 2MFI | Melt flow index of the polymer produced in the assembly of loop reactors |
| 2% C2 | Percentage of comonomer incorporated in copolymer produced in the assembly of loop reactor(s) |
| % C2PP | Percentage of comonomer incorporated in copolymer produced in the assembly of loop reactor(s) and gas-phase reactor(s) |
| % C2BIPO | Percentage of comonomer incorporated in copolymer fraction produced in gas-phase |
| IV | Intrinsic viscosity of polymer |

TABLE 3-continued

| Variable | Description |
| --- | --- |
| MFI_RFG | Melt flow index of polymer produced in the arrangement of loop reactor(s) and gas-phase reactor(s) |
| 1TV | Opening of the temperature control valve of the 1st loop reactor |
| 1JI | Circulation pump power of the 1st loop reactor |
| 2TV | Opening of the temperature control valve of the 2nd loop reactor |
| 2J1 | Circulation pump power of the 2nd loop reactor |
| 1DT | Difference between the temperature and the bubble point of the liquid within the 1st loop reactor |
| 2DT | Difference between the temperature and the bubble point of the liquid within the 2nd loop reactor |
| PRESS | Pressure of gas-phase reactor(s) |
| TV_RFG | Opening of the temperature control valve of gas-phase reactor(s) |
| CAT | Flow rate of the catalyst fed to the assembly of reactors |
| 1C3 = | Flow rate of the propylene stream fed to the 1st loop reactor |
| 1[H2] | Concentration of hydrogen in the stream fed to the 1st loop reactor |
| 1C2 = | Flow rate of comonomer stream fed to the 1st loop reactor |
| 2C3 = | Flow rate of propylene stream fed to the 2nd loop reactor |
| 2[H2] | Concentration of hydrogen in the stream fed to the 2nd loop reactor |
| 2C2 = | Flow rate of comonomer stream fed to the 2nd loop reactor |
| T/D | Ratio of flow rate of electron donor to flow rate of cocatalyst |
| H/ET | Ratio of hydrogen concentration to comonomer concentration within the gas-phase reactor(s) |
| ET/(ET + PR) | Ratio of comonomer concentration to the sum of comonomer and propylene concentrations within the gas-phase reactor(s) |
| C2 = _RFG | Flow rate of comonomer fed to the gas-phase reactor(s) |
| 1TIC | Temperature of the 1st loop reactor |
| 2TIC | Temperature of the 2nd loop reactor |
| T/D | Ratio of flow rate of electron donor to flow rate of cocatalyst |
| 2PR | Production rate of the 2nd loop reactor |
| LEVEL | Level of the bed of gas-phase reactor(s) |
| T402 | Flow rate of gas returning from separation tower |

EXAMPLE

Figure 7:
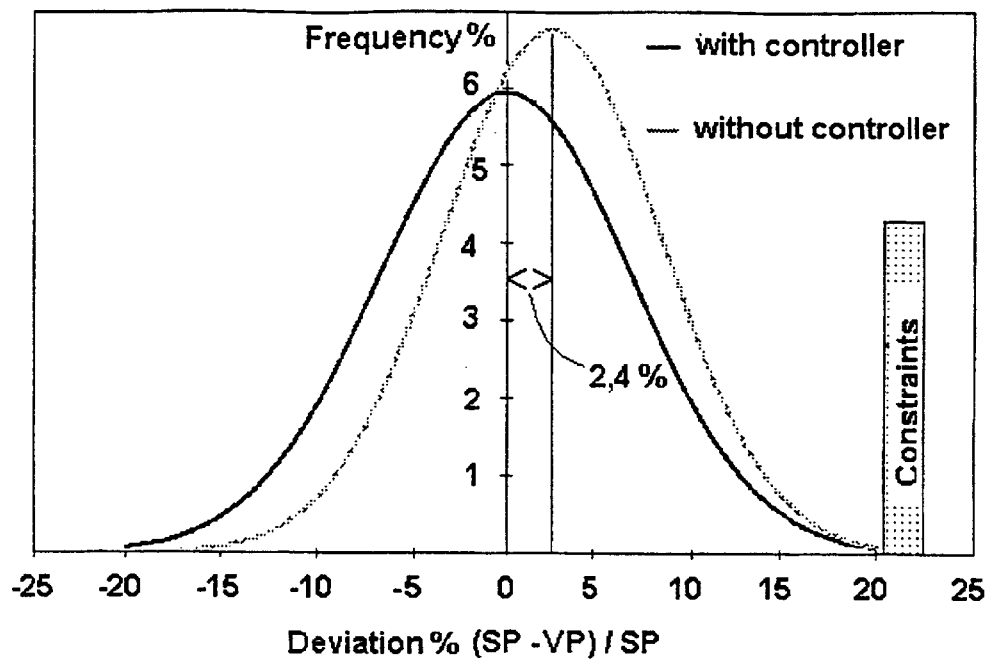
FIG. 7 shows the increase in production rate of the first loop reactor due to the decrease in the variability.

One of the main benefits obtained from the advanced control relates to the decrease in the variability of the product quality and in process variables such as the density of the reaction medium and production rate. If the maximum values usually observed for variables such as density of the reaction medium and production rate are maintained, the decrease in the variability is reflected in an increase of the average values for these variables, this being desirable under the economic point of view. FIG. 7, where SP means set point and PV represents the process variables, shows an increase in the average production rate of the first loop reactor that resulted from the application of the control strategy, according to the present invention, in the polypropylene plant at issue. It is observed that the decrease in the variability of the production rate allows that the average of this variable is shifted 2.4% towards the maximum value usually obtained.

Figure 8:
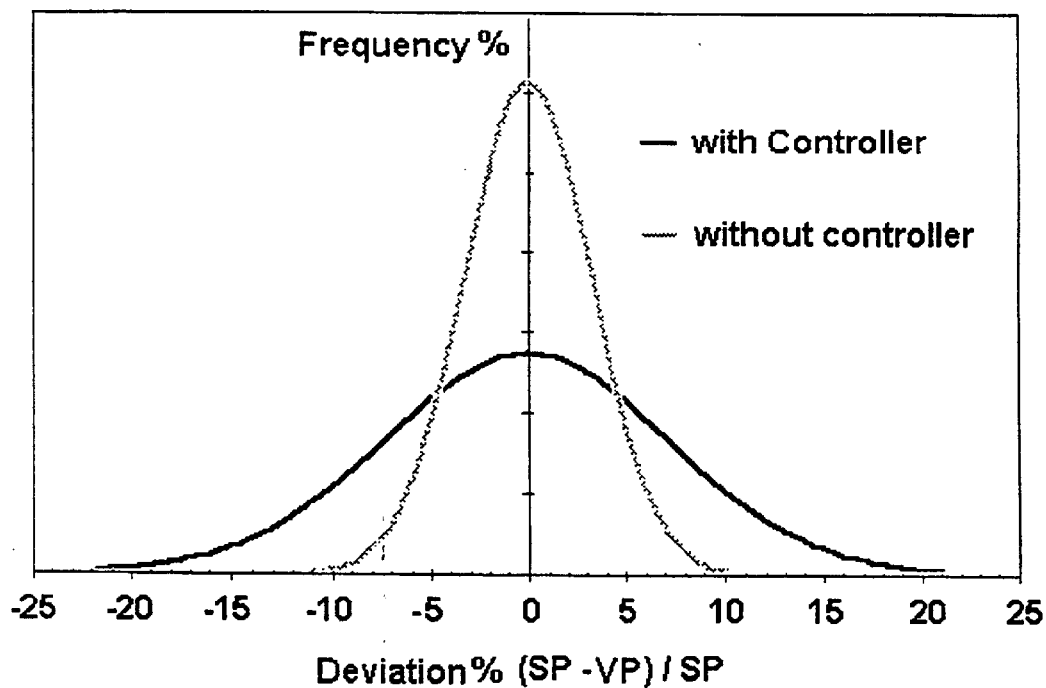
FIG. 8 shows the decrease in the variability of the melt flow index of the polymer produced in the first loop reactor due to the distribution of the difference between the desired value and the process variable.

FIG. 8, on its turn, presents a decrease in the variability that is observed in the melt flow index of the polymer produced in the first loop reactor. Standard deviation of the error between the desired value for the property and obtained value was decreased from 7.2% to 3.2%, a 55% reduction of the standard deviation, equivalent to an 80% decrease in error variance.

We claim:

1. A method for on line control of a polymerization plant, that uses a multivariable non linear constrained model predictive control algorithm and inferred values for polymer properties which measurements are not continuously available, said inferred values being calculated by mathematical models of the process and periodically corrected by laboratory tests which use polymer samples collected from the production line, said method being directed to control the production of polypropylene and its copolymers in a plant comprising at least one loop reactor and, optionally, one or more gas-phase reactors disposed in a serial conformation with the loop reactor(s) preceding the gas-phase reactor(s), said method using preferably but not exclusively three layer feed-forward neural networks as process models, the method comprising:

simultaneous calculation by the multivariable non linear constrained model predictive control algorithm of the sequence of adjustments to be effected on a set of manipulated variables (1) comprising;
the ratio of cocatalyst flow rate to electron donor flow rate;
the hydrogen concentration in the feed stream of each loop reactor;
the flow rate of the catalyst fed to the reactor arrangement;
the flow rate of propylene fed to the loop reactor(s); and
the flow rate of comonomer(s) fed to the loop reactor(s); and in case one or more gas-phase reactors are used:
the ratio of hydrogen concentration to comonomer(s) concentration within gas-phase reactors;
the ratio of each comonomer concentration to the sum of propylene concentration and comonomer(s) concentration within each gas-phase reactor; and
the flow rate of each comonomer fed to each gas-phase reactor,
so as to bring the values of a set of controlled variables (8) close to the set points established for these variables, said set of controlled variables comprising
the production rate of the arrangement of loop reactors;
the production rate of each loop reactor,
the ratio between the production rate of each loop reactor and the production rate of the arrangement of loop reactors;
the density of the reaction medium within loop reactors;
the melt flow index of the polymer produced in the arrangement of loop reactors;
the melt flow index of the polymer produced in each loop reactor, and
the percentage(s) of comonomer(s) incorporated in polymer in the arrangement of loop reactors;
and in case one or more gas-phase reactors are used:
the melt flow index of the polymer produced in the arrangement of loop and gas-phase reactors;
the percentage(s) of comonomer(s) incorporated in polymer in each loop reactor;
the percentage(s) of comonomer(s) incorporated in the polymer produced in the arrangement of loop and gas-phase reactors;
the percentage(s) of comonomer(s) incorporated in the fraction of the polymer produced in gas-phase reactors; and
the intrinsic viscosity of the polymer;

without violating the rate of change (ROC) limits imposed on manipulated variables (1) and the limits imposed for a set of constrained controlled variables (6) comprising;
the power of the pump that promotes the circulation of the reaction medium within each loop reactor;
the opening of the valve that controls the temperature of each loop reactor, and
the difference between the reactor temperature and the bubble point of the liquid within each loop reactor,
and in case one or more gas-phase reactors are used:
the pressure of each gas-phase reactor; and
the opening of the valve that controls the temperature of each gas-phase reactor,
taking into consideration the following variables as disturbances (7):
density of the reaction medium within the loop reactor(s);
the temperature of loop reactor(s); and
the production rates of loop reactor(s);
and in case one or more gas-phase reactors are used:
the bed level in the gas-phase reactor(s);
the flow rate of the stream that returns from the cormonomer/propylene separation tower; and
on-line calculation of inferred values for a set of variables comprising:
the melt flow index of the polymer produced in loop reactors;
the percentage(s) of comonomer(s) incorporated in polymer in loop reactors; and
the percentage of xylene-soluble matter; and in case one or more gas-phase reactors are used:
the melt flow index of the polymer produced in the arrangement of loop and gas-phase reactors;
the percentage(s) of comonomer(s) incorporated in the polymer produced in the arrangement of loop and gas-phase reactors;
the percentage(s) of comonomer(s) incorporated in the fraction of the polymer produced in gas-phase reactors;
the intrinsic viscosity of the polymer; and
the percentage of xylene-soluble matter.

2. The method according to claim 1, wherein the relationships among measured process inputs (1,2) and outputs (4,5,6) are described by a control matrix comprising the following models:
model for flow index of polypropylene and its copolymers produced in loop reactors using the following input variables:
the hydrogen concentration in the feed stream(s) of the reactor(s);
the flow rate of catalyst fed to the reactor(s);
the flow rate of propylene fed to the reactor(s);
the flow rate of comonomer(s) fed to the reactor(s);
the ratio of flow rate of cocatalyst to electron donor flow rate; and
the temperature of the reactor(s);
model for flow index of polypropylene and its copolymers produced in gas-phase reactors using the following input variables:
the hydrogen concentration in the feed stream(s) of the loop reactor(s) preceding the gas phase reactor;
flow of comonomer(s) fed to gas-phase reactor;
the flow rate of catalyst fed to the reactor(s); and
the temperature of the reactor(s);
model for intrinsic viscosity of polypropylene and its copolymers using the following input variables;
the ratio of hydrogen concentration to comonomer(s) concentration inside the gas-phase reactor as input variable;
model for percentage(s) of comonomer(s) incorporated in the polymer produced in loop reactors using the following input variables:
flow of comonomer(s) fed to the reactor;
production rate of the reactor;
flow of comonomer(s) fed to the preceding reactor(s); and
production rate of the preceding reactor(s);
model for production rate of loop reactors using the following input variables:
the ratio of electron donor flow rate to cocatalyst flow rate;
the hydrogen concentration in feed stream(s) of loop reactor(s);
the flow rate of catalyst fed to loop reactor(s);
the flow rate of propylene fed to loop reactor(s);
the flow rate comonomer(s) fed to loop reactor(s); and
the temperature of the loop reactor(s);
model for the opening of the temperature control valve of loop reactors using the following input variables;
the ratio of flow rate of electron donor to flow rate of cocatalyst that comprise catalytic system;
the hydrogen concentration in feed stream(s) of loop reactor(s) and gas-phase reactor(s);
the flow rate of catalyst fed to loop reactor(s);
the flow rate of propylene fed to loop reactor(s);.
the flow rate comonomer(s) fed to loop reactor(s); and
the temperature of loop reactor(s);
model for density of reaction medium within loop reactors using the following input variables:
the flow rate of monomer fed to loop reactor;
the production rate of the loop reactor; and
the density of reaction medium of the preceding loop reactor;
model for the power of the recirculation pump of loop reactors using the following input variables:
the flow rate of Monomer fed to loop reactor;
the production rate of the loop reactor, and
the density of reaction medium of the preceding loop reactor;
model for the difference between the temperature and the bubble point of the liquid within loop reactors using the following input variables:
the hydrogen concentration in feed stream(s) of loop reactor(s) and gas-phase reactor(s);
the flow rate of propylene fed to loop reactor(s);
the flow rate comonomer(s) fed to loop reactor(s);
the temperature of the loop reactor; and
the production rate of the loop reactor(s)
model for the ratio between the production rates of two consecutive loop reactors using the following input variables:
the ratio of flow rate of electron donor to flow rate of cocatalyst that comprise catalytic system;
the hydrogen concentration in feed stream(s) of loop reactor(s) and gas-phase reactor(s);
the flow rate of catalyst fed to loop reactor(s);
the flow rate propylene fed to loop reactor(s);
the flow rate comonomer(s) fed to loop reactor(s); and
the temperature of loop reactor(s);
model for the percentage(s) of comonomer(s) incorporated in the polymer produced in gas-phase reactors using the following input variables:

the hydrogen concentration in the feed stream(s) of the loop reactor(s) preceding the gas phase reactor;

flow of comonomer(s) fed to gas-phase reactor;

the flow rate of catalyst fed to the reactor(s); and the temperature of the reactor(s);

model for the percentage(s) of comonomner(s) incorporated in bipolymer using the following input variables:

the ratio of the concentration of a given comonomer to the sum of comonomer(s) concentration and propylene concentration inside a gas-phase reactor, model for the pressure of gas phase reactors using the following input variables:

the flow rate of catalyst fed to the reactor(s);

the density of reaction medium of the loop reactor(s);

the flow rate comonomer(s) fed to the gas phase reactor;

the gas-phase reactor bed level; and the flow rate of gas returning from separation tower;

model for the opening of the temperature control valve of gas phase reactors using the following input variables:

the flow rate of catalyst fed to the reactor(s);

the density of reaction medium of the loop reactor(s);

the flow rate comonomer(s) fed to the gas phase reactor; and the gas-phase reactor bed level.

3. The method according to claim 1, wherein the mathematical model for inference of the melt flow index of the polymer produced in loop reactors involves the following input variables:

the hydrogen concentration in the feed stream(s) of the reactor(s);

the flow rate of catalyst fed to the reactor(s);

the flow rate of propylene fed to the reactor(s);

the flow rate of comonomer(s) fed to the reactor(s);

the ratio of flow rate of cocatalyst to electron donor flow rate; and the reactor(s) temperature.

4. The method according to claim 1 or 2, wherein the mathematical model for inference of the melt flow index of the polymer produced in gas-phase reactors involves the following input variables;

the hydrogen concentration in the feed stream(s) of the loop reactor(s) preceding the gas phase reactor;

flow of comonomer(s) fed to gas-phase reactor;

production rate of gas phase reactor, and production rate of the reactor(s) preceding the gas phase reactor.

5. The method according to claim 1 or 2, wherein the mathematical model for inference of the intrinsic viscosity of polypropylene and its copolymers involves the ratio of hydrogen concentration to comonomer(s) concentration within the gas-phase reactor as input variable.

6. The method according to claim 1 or 2, wherein the mathematical model for inference of the percentage of xylene-soluble matter in the polymer produced in loop reactors involves the following input variables:

the flow rate of the comonomer(s) fed to the reactor(s);

the ratio of flow rate of cocatalyst to flow rate of electron donor;

the reactor(s) temperature; and the density of reaction medium within the reactor(s).

7. The method according to claim 1 and 2, wherein the mathematical model for inference of the percentage of xylene-soluble matter in the polymer produced in gas-phase reactors involves the following input variables:

the percentage of xylene-soluble matter of the polymer fed to the gas-phase reactor(s);

the percentage of comonomer(s) in xylene-soluble matter of polymer, and the percentage of comonomer(s) in polymer.

8. The method, according to claim 1 or 2, wherein the mathematical model(s) for inference of percentage(s) of comonomer(s) incorporated in the polymer produced in loop reactors involves(involve) the following input variables:

the flow of comonomer(s) fed to the reactor;

the production rate of the reactor;

the flow of comonomer(s) fed to the preceding reactor(s); and the production rate of the preceding reactor(s).

9. The method according to claim 1 or 2, wherein the mathematical model(s) for inference of percentage(s) of comonomer(s) incorporated in the polymer produced gas-phase reactors involves(involve) the following input variables:

flow of comonomer(s) fed to gas-phase reactor, production rate of said gas phase reactor, and production rate of the reactor(s) preceding the gas phase reactor.

10. The method according to claim 1 or 2, wherein the mathematical model(s) for inference of percentage(s) of comonomer(s) incorporated in bipolymer uses(use) the ratio of the concentration of a given comonomer to the sum of comonomer(s) concentration and propylene concentration within the gas-phase reactor(s) as input variable.

11. The method according claim 1, wherein the mathematical models may be empirical or rigorous or a combination of rigorous and empirical models.

12. A process for the production of polypropylene and its copolymers, wherein the propylene is polymerized in a plant comprising at least one loop reactor and optionally, one or more gas-phase reactors disposed in a serial conformation with the loop reactor(s) preceding the gas-phase reactor(s), in polymerization conditions, in the presence of hydrogen, a Ziegler-Natta catalyst and, optionally, one or more olefin comonomers including ethylene; 1-butene; 2-methyl propylene; 1-pentene; 1-hexene; 1-heptene; 1-octene; 1-decene; 3-methyl 1-butene; 4-methyl 1-pentene, and cyclopentene, wherein the polymerizaton process is controlled by the method of claim 1.

* * * * *

UNITED STATES PATENT AND TRADEMARK OFFICE
CERTIFICATE OF CORRECTION

PATENT NO. : 6,718,234 B1
DATED : April 6, 2004
INVENTOR(S) : Demoro et al.

It is certified that error appears in the above-identified patent and that said Letters Patent is hereby corrected as shown below:

Title page,
Item [54], Title, change "SYSTEM FOR ON LINE INFERENCE OF PHYSICAL AND CHEMICAL PROPERTIES AND SYSTEM FOR ON LINE" to -- SYSTEM FOR ON LINE INFERENCE OF PHYSICAL AND CHEMICAL SYSTEM FOR ON LINE CONTROL --.
Item [75], Inventors, change the second inventors name from "Autur Toledo Martins De Oliverira" to -- Artur Toledo Martins De Oliverira --.

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO.    : 6,718,234 B1
DATED         : April 6, 2004
INVENTOR(S)   : Esdras P. Demoro et al.

It is certified that error appears in the above-identified patent and that said Letters Patent is hereby corrected as shown below:

<u>Title page,</u>
Item [75], Inventors, change "Autur Toledo martins De Oliveria" to
-- Artur T.M. Oliveira --.

Signed and Sealed this

Seventh Day of February, 2006

JON W. DUDAS
*Director of the United States Patent and Trademark Office*